Patented Nov. 8, 1949

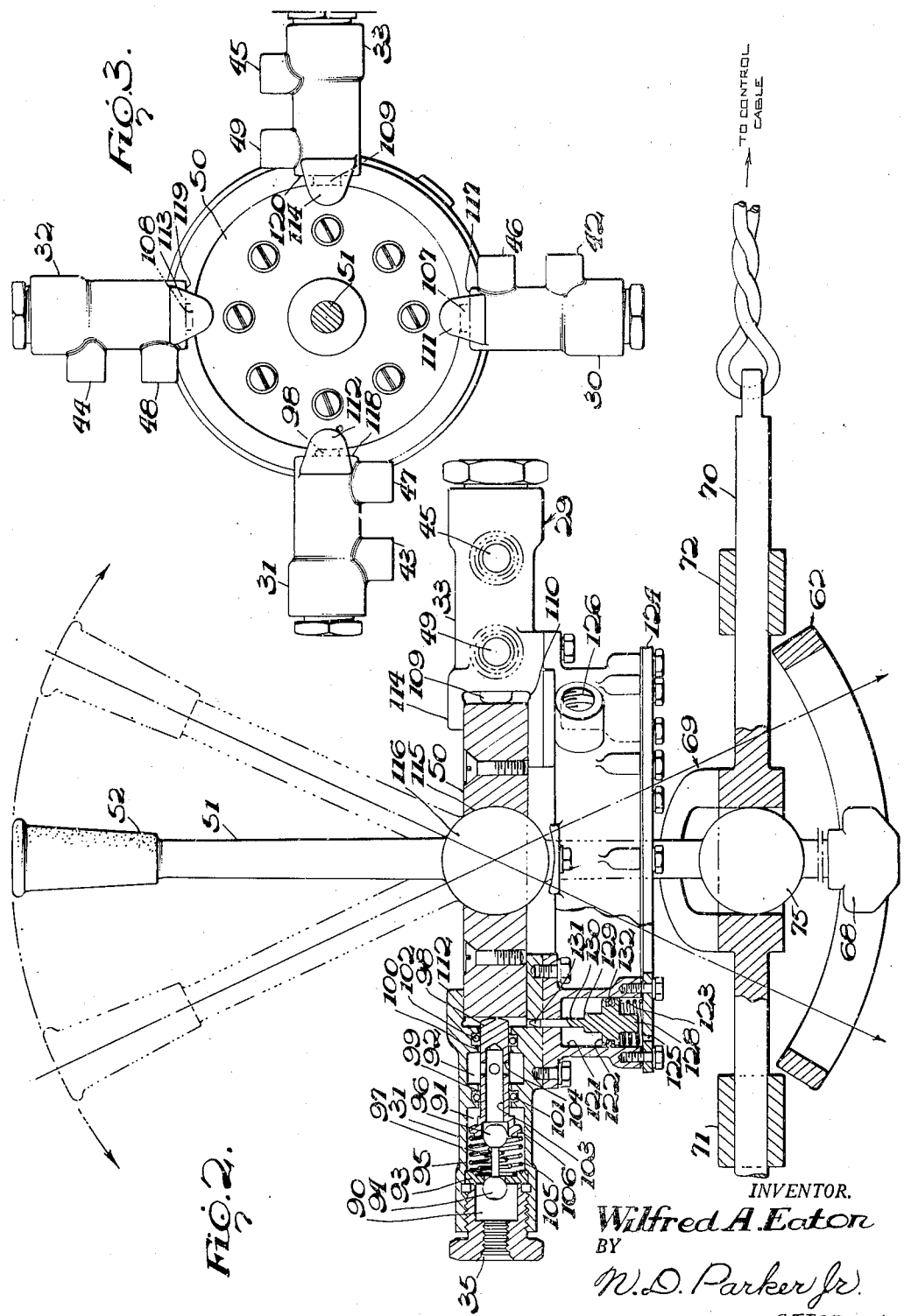

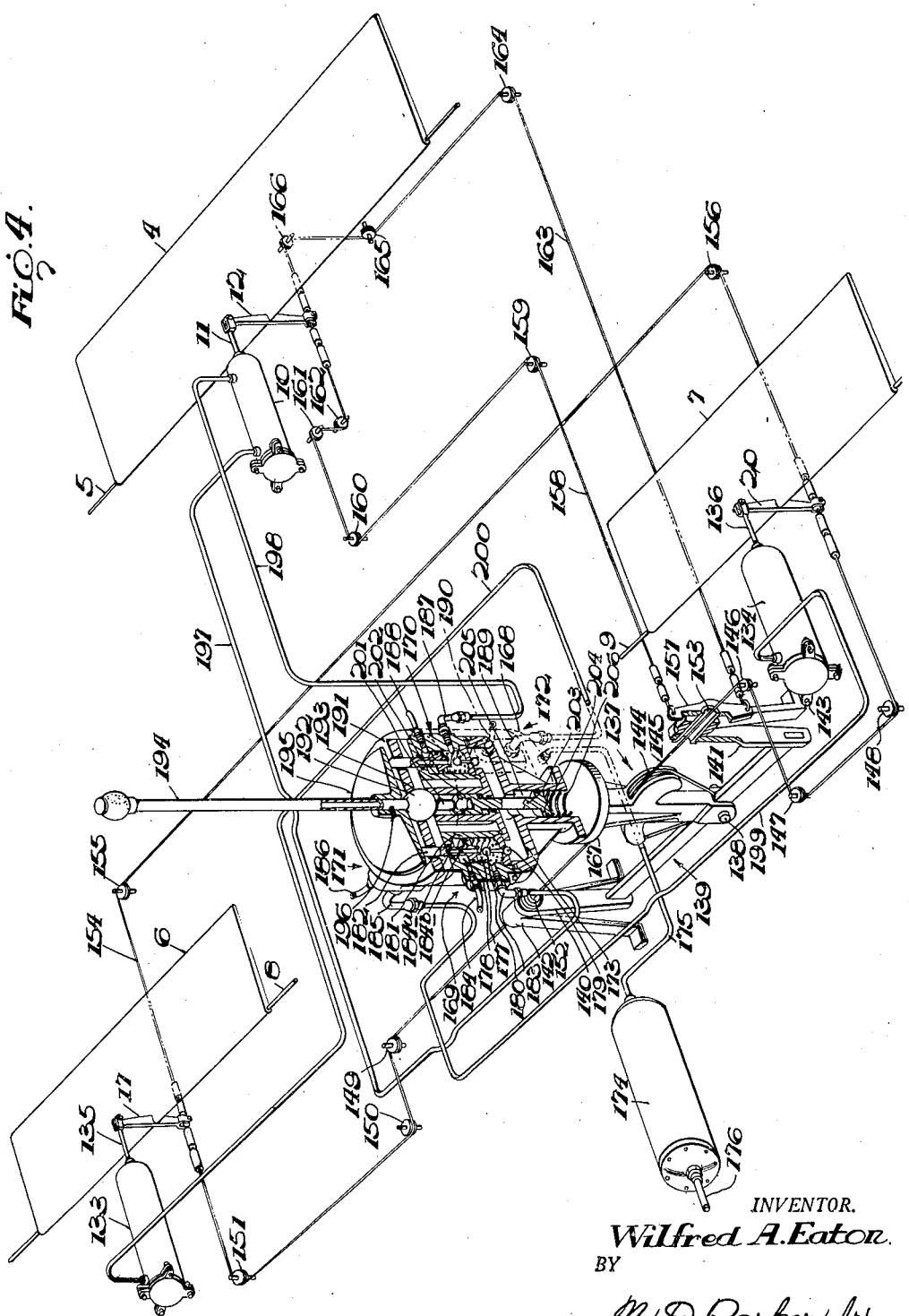

2,487,116

UNITED STATES PATENT OFFICE 2,487,116

FLUID PRESSURE CONTROL SYSTEM

Wilfred A. Eaton, Elyria, Ohio, assignor to Bendix-Westinghouse Automotive Air Brake Company, Elyria, Ohio, a corporation of Delaware Application August 7, 1943, Serial No. 497,837

12 Claims. (Cl. 244—85)

This invention relates to fluid pressure control mechanism, and more particularly to mechanism of the above tpye for controlling the operation of an airplane.

It has previously been proposed to provide power-operated means for controlling the operation of the control surfaces of an airplane in connection with the conventional directly connected mechanical control, but some of the previous constructions have necessitated a lost motion connection between the pilot's control element and the control surfaces for the purpose of controlling the supply of power to the power means, this arrangement resulting in an undesirable slack in the control linkage during operation by mechanical means alone on failure of the power supply, and it is accordingly an object of the present invention to provide means for overcoming this objectionable condition.

A further object of the invention is to provide in connection with fluid actuators for controlling the operation of the control surfaces of an airplane, valvular means for controlling the supply of fluid pressure to these actuators so constituted as to be readily adapted for operation by the conventional pilot's control element.

Yet another object of the invention is to provide, in connection with a system of the above type, means for normally permitting operation of the valve mechanism by the pilot's control element by means of a suitable lost motion connection, together with means for eliminating the lost motion effect on failure of the power supply without requiring any action on the part of the pilot to accomplish this desirable end.

Still another object of the invention is to provide, in a mechanism of the above type, means under the control of the pilot's control element for controlling the energization of the power actuators so constituted as to provide a coordinated combined mechanical and power operation of the control surfaces.

Another object of the invention is to provide, in a system of the above type, means for automatically advising the pilot as to the degree of power being applied to the power actuators.

A still further object of the invention is to provide control mechanism for power actuators in a system of this type so constituted as to permit the regular mechanically operated control element to be replaced by an element which is so constituted as to provide mechanical control in conjunction with an efficient control of the power actuators connected to the control surfaces, Other objects and novel features of the invention will appear more fully hereinafter from the following detailed description when taken in connection with the accompanying drawing wherein two embodiments of the invention are illustrated in considerable detail. It is to be expressly understood, however, that the drawings are utilized for purposes of illustration only and are not designed as a definition of the limits of the invention, reference being had to the appended claims for this purpose.

In the drawing wherein similar reference characters refer to like parts throughout the several views:

Fig. 2 is a view, partially in section, of the control valve mechanism utilized in the embodiment shown in Fig. 1;

Fig. 3 is another view of the control valve mechanism illustrated in Fig. 2, and Fig. 4 is a diagrammatic view, partially in section, of another embodiment of the invention.

Figure 1:
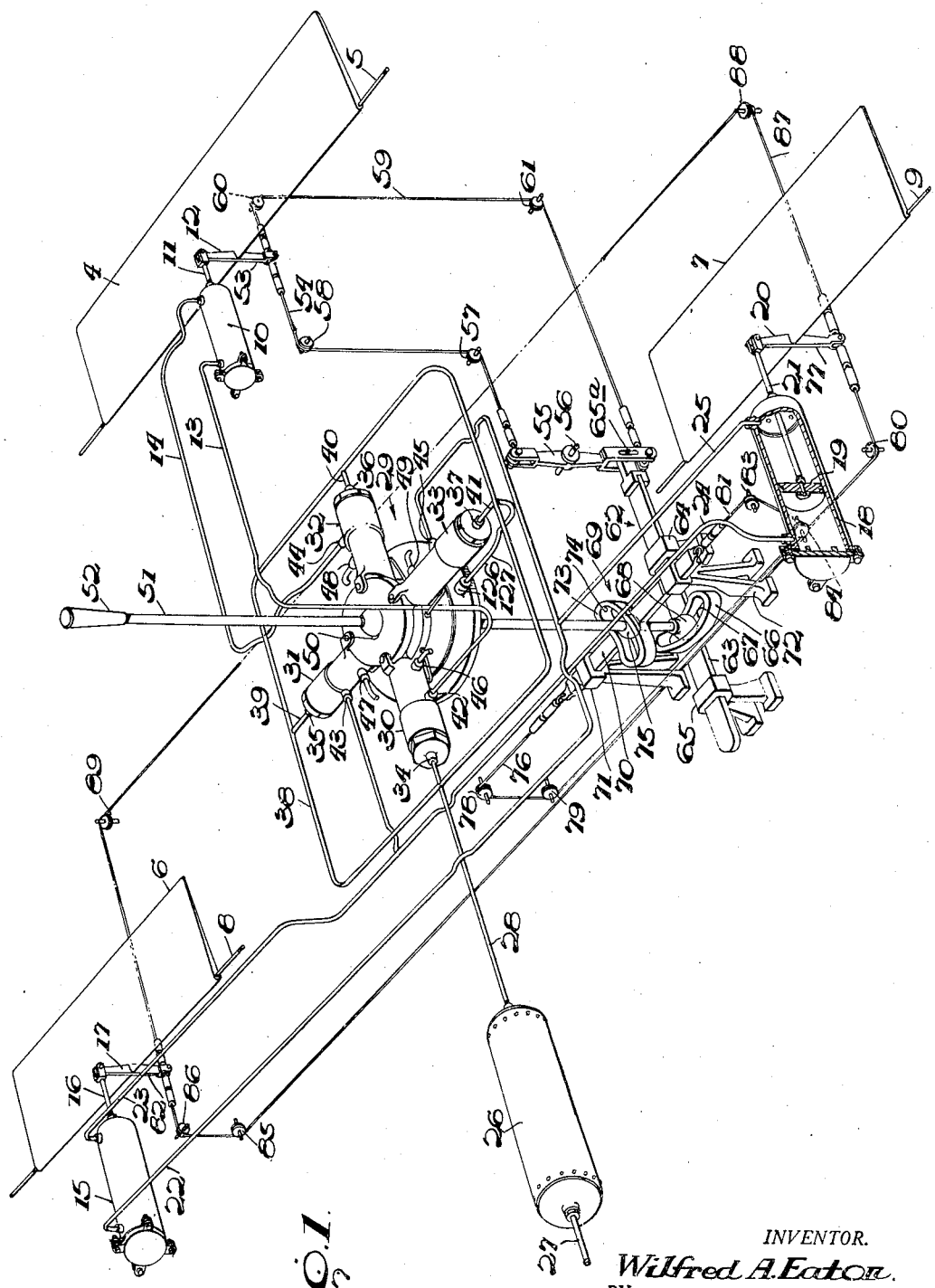
Fig. 1 is a diagrammatic view, partially in section, of one embodiment of the above referred to control mechanism.

Referring more particularly to Fig. 1, there is illustrated therein, in connection with an airplane, not shown, an elevator 4 adapted to be pivotally mounted on the airplane body for rotation about an axis 5, together with right and left ailerons 6 and 7 adapted for rotation with respect to the body portion of the airplane about axes 8 and 9 respectively. Power operation of the elevator 4 is accomplished by means of a double-acting fluid motor 10 having an operating connection with the elevator through the medium of a piston rod 11 connected with the upper end of a lever 12 carried by the elevator 4, the double-acting fluid motor being supplied with fluid pressure by a suitable control valve, to be described later, through the medium of conduits 13 and 14, as shown. In like manner, a double-acting fluid motor 15 is adapted to operate the aileron 6 through the medium of a piston rod 16 having a connection with a lever 17 carried by the aileron, while the left aileron 7 is actuated by means of a fluid motor 18, provided with a piston 19 slidably mounted therein and connected with a lever 20 on the aileron 7 by means of a piston rod 21. The fluid motor 15 is supplied with fluid pressure through conduit 22 or conduit 23, while the motor 18 is supplied with fluid pressure through conduit 24 or conduit 25, it being understood, with particular reference to the construction of the motor 18 shown sectionally in the drawing, that on application of fluid pressure thereto through the conduit 24, the piston 19 will be moved to the right, while on application of fluid pressure thereto through the conduit 25, the piston will be moved to the left.

In order that the above fluid motors may be supplied with fluid pressure under the control of the operator, a fluid pressure reservoir 26 is mounted on the airplane, and supplied with fluid pressure from a compressor, not shown, through a conduit 27, the reservoir being connected by means of a supply conduit 28 to a pilot's control valve mechanism 29, to be more fully described hereinafter. The pilot's control mechanism 29 is rigidly mounted on some portion of the airplane, and is provided with four horizontal valves 30, 31, 32 and 33 arranged in the same plane at 90° intervals, these valves being provided with inlet ports 34, 35, 36 and 37. The inlet port 34 is directly connected with the conduit 28, the conduit 28 in turn being connected with a conduit 38 which is connected with the inlet port 35 through conduit 39, with the inlet port 36 through a conduit 40, and with the inlet port 37 through a conduit 41. The above named valves are also provided respectively with outlet ports 42, 43, 44 and 45, as well as exhaust ports 46, 47, 48 and 49, and it will be understood, in the light of the following description, that the valve 30 is operable to either connect the ports 42 and 46 or to disconnect these ports and connect the ports 42 and 34, the valves 31, 32 and 33 being operable in like manner to connect ports 43 and 47 or ports 43 and 35, ports 44 and 48 or ports 44 and 36, and ports 45 and 49 or ports 45 and 37 in order to control the pressure of fluid in the various fluid motors.

The valves are operated, as will be more fully described hereinafter, by the movement of a valve operating member or disc 50, mounted for sliding movement in any direction in the plane of the above described valves, while mechanical operation of the control surfaces is accomplished by means of a pilot's control element or lever 51 carried by the valve operating element and mounted for universal movement with respect thereto. The upper end of the lever is provided with a handle for operation by the pilot, while the lower end of the lever is connected through suitable cables with the elevator 4 and the ailerons 6 and 7. In order to accomplish this connection, the elevator, for example, is provided with an extension 53 on the lever 12, the lower end of this lever having a pivotal connection with a cable 54 connected at its left end with a lever 55 mounted for pivotal movement on the body of the airplane by means of a pivot pin 56, the cable being guided by means of suitable pulleys 57 and 58, the connection between the lever 53 and the lever 55 being completed by means of a second cable 59 having a pivotal connection with the lower end of the lever 55, and guided by means of pulleys 60 and 61, it being understood that the cable is so installed as to be under tension at all times in order to permit movements imparted to the lever 55 to be likewise imparted to the lever 53 in order to control the operation of the elevator 4. An operating connection is established at the lower end of the lever 55 and the lower end of the pilot's control element 51 by means of a yoke member 62 having a bar portion 63 slidably mounted for longitudinal movement with respect to the airplane in a pair of brackets or guides 64 and 65 mounted on the fuselage of the airplane and connected to lever 55 by a pivot pin 65a. This yoke member is provided with a portion 66 having a transverse slot 67, the wall of the slot being in engagement at all times with the outer surface of a ball portion 68 formed on the lower end of the control element 51. Thus with the control element in the position shown, clockwise rotation of the element in the plane of the valves 30 and 32 about its connection with the disc 50, serves to move the ball 68 to the left with corresponding movement in the same direction of the yoke 62, with corresponding movement of the lever 55 in a clockwise direction to exert tension on the cable 59 which will move the lever 53 in a counter-clockwise direction and turn the elevator 4 to depress the tail of the airplane and cause the airplane to climb, while movement of the control element 51 in the other direction will cause corresponding reverse movement of the elevator 4, this type of operation being substantially conventional with present day airplanes. It is also noted that the control element 51 may be rotated in either direction about its mounting on the disc 50 in the plane of the valves 31 and 33 without imparting movement to the yoke member 62, and this motion is utilized to control the operation of the ailerons 6 and 7 through the medium of a yoke member 69 having a slide portion 70 mounted for sliding movement transversely of the airplane in brackets 71 and 72 mounted thereon. This yoke is likewise provided with a portion 73 provided with a slot 74 having its walls at all times in engagement with the surface of a ball member 75 formed on the control element directly above the ball 68, and it will be evident that rotation of the control element 51 in a plane transversely of the fuselage will impart sliding movement to the member 69. The left end of the member 69 is suitably connected to a cable 76, connected at its other end with an extension 77 of the lever 29 and suitably guided by means of pulleys 78, 79 and 80, while the right end of the member 69 is connected with a cable 81 connected at its other end with an extension 82 of the lever 17, the latter cable being guided by means of pulleys 83, 84, 85 and 86, it being understood that the above referred to pulleys are suitably mounted for rotation with respect to the fuselage of the airplane in a manner well known to those skilled in the art. In order to insure proper control of the operation of the ailerons 6 and 7 by the operation of the above cables, the lower ends of the levers 77 and 82 are further connected through the medium of a cable 87, guided by pulleys 88 and 89, it being understood that the above described cables are so installed as to be under suitable tension in order to insure that the movements of the ailerons will correspond to the transverse movements of the yoke member 69. Thus on rotation of the control element 51 in a counter-clockwise direction with respect to the disc 50 in the plane of valves 31 and 33, the member 69 will slide to the right, as viewed in the drawing, exerting a tension on the cable 76, which, by virtue of its connection with the lower end of the lever 77, will serve to rotate the aileron 7 in a clockwise direction. At the same time this tension will be transmitted to the lower end of the lever 82 through the medium of the cable 87, and the aileron 6 will rotate in a counter-clockwise direction, the combined action of the ailerons, with respect to the slip stream of the airplane, serving to depress the right wing of the airplane and to raise the left wing in order to rotate the airplane around its longitudinal axis. In like manner on rotation of the element 51 in the opposite direction transversely of the airplane, the ailerons will rotate in the opposite direction to rotate the airplane in the opposite direction. It will be understood from the foregoing that movement of the lever 51 in a fore and aft direction will control the operation of the elevator, while movement in a transverse direction will control the operation of the ailerons, any movement of the element in a direction intermediate the above, serving to concurrently control the elevator and ailerons in the well known manner.

The operation of the various controls by purely mechanical means is, therefore, substantially simple, and with particular reference to Fig. 2 of the drawing, novel means are provided for controlling the operation of the valves 30, 31, 32 and 33. The valve 31, for example, shown in section in Fig. 2, is provided with an inlet chamber 90, an outlet chamber 91 and an exhaust chamber 92, the inlet chamber being connected with the inlet port 35 as shown. The inlet chamber is spaced from the outlet chamber by means of a ported partition 93, and communication between the two chambers through the ported partition is normally prevented by means of an inlet valve 94 provided with a stem 95 and an exhaust valve 96 mounted on the right end thereof, the inlet valve being normally maintained in port closing position by means of a suitable spring 97 interposed between the partition and the exhaust valve. A valve operating plunger 98 is slidably mounted in bores 99 and 100 as shown, these bores being provided respectively with suitable sealing members 101 and 102 in order to prevent leakage by the surface of the plunger. The plunger is provided with a centrally located bore 103 connected with the exhaust chamber 92 through the medium of an exhaust port 104 formed in the wall of the bore, and the plunger is normally urged to the right by means of a spring 105 interposed between the partition 93 and a flanged portion 106 formed in the left end of the plunger in such a manner that the bore 103 is normally in communication with the outlet chamber 91. The exhaust chamber 92 is connected with atmosphere by means of the exhaust port 47, shown in Fig. 3, and it will be readily apparent that with the parts in the position shown, the outlet port 43, connected with the outlet chamber 91, as indicated in Fig. 3, is connected with atmosphere through the bore 103, the ports 104, the chamber 92, and exhaust port 47, while communication is prevented between the inlet chamber 90 and the outlet chamber 91. On movement of the valve operating member 50 to the left, by means to be later described, the initial movement serves to cause the exhaust valve to close the left end of the bore 103 to prevent communication between the outlet and exhaust chambers, further movement to the left opening the intake valve and permitting communication between the inlet and outlet chambers. The valves 30, 32 and 33 are preferably of identical construction, and as illustrated more particularly in Fig. 3, are provided respectively with valve operating plungers 107, 108 and 109.

In order that the valves can be operated by the operation of the control element 51, the disc 50 is mounted for limited sliding movement on a surface 110 formed on the valve casing, the outer periphery of the disc being in contact with the valve operating plungers 98, 107, 108 and 109, and being maintained in the position shown relative to the surface 110 by means of suitable guiding lugs 111, 112, 113 and 114, the disc thus being free to slide in any direction transversely of the axis of the element 51 in the position shown, but being restrained from movement in any other direction. The central portion of the disc is provided with a spherically formed socket 115 which serves to engage a ball 116 formed on the element 51 in order to provide for universal pivotal movement of the latter with respect to the disc. It will thus be apparent that on initial movement of the control element 51 in a counter-clockwise direction as viewed in Fig. 2, the element will tend to pivot about the ball 75, with a resultant tendency for the ball 116 to move to the left in order to provide corresponding movement of the disc 50 on the sliding surface 110 to operate the valve 31 by moving the valve plunger 98 to the left to first close the exhaust valve, and to subsequently open the inlet valve to connect the inlet and outlet chambers. In like manner, movement of the element 51 in the opposite direction will serve to operate the valve mechanism 33 in a similar manner, while movement of the element in a plane at right angles to the plane of the drawing, will serve to control the operation of the valves 30 and 32, the element in this case pivoting about the ball 68 during initial movement in order to permit sliding movement of the disc 50. In the event the element is operated intermediate the above planes, it is obvious that two adjacent valves in that quadrant will be operated at the same time. In view of the fact that the left end of the valve operating plunger 98 is subjected to the pressure in the outlet chamber, it will also be understood that this action serves at all times to advise the operator of the degree of pressure in the outlet chamber, the area of the plunger being so chosen as to permit the desired degree of reaction on the disc 50 and on the control element 51.

Referring again to Fig. 1, it will be clear from the foregoing description that on movement of the element 51 in a counter-clockwise direction in the plane of the valves 30 and 32, the disc 50 will be moved to the left to operate the plunger of the valve 30 to disestablish the connection between ports 42 and 46 and to establish a connection between the inlet port 34 and the port 42 to supply fluid pressure to the left end of the fluid motor 10 through conduit 13 in order to move the piston rod 11 to the right to effect clockwise rotation of the elevator 4 about the axis 5, this action being opposed, when any appreciable degree of pressure is established in the motors, by means of the reaction of the air pressure on the valve operating plunger of the valve 30. In the event the element 51 is moved to a certain angle in the manner above described and then maintained in this position, it will be apparent that a force will also be exerted to the right on the member 62 by means of the ball 68 which will tend to rotate the lever 55 in a counter-clockwise direction in order to exert a pull on the cable 54 to turn the lever 53 and the elevator 4 in a clockwise direction, and with the element held stationary as described, the fluid pressure acting on the left end of the motor 10 will continue to move the elevator in a clockwise direction until such a time as the motion is sufficient to move the lower end of the element 51 to the right sufficiently to permit movement of the disc 50 to the right to permit closing of the exhaust valve of the valve 30, the element 51 rotating about the operator's hand as a fulcrum during this period of operation. Thus the operation of the valve mechanism is self-lapping, the mechanism serving to automatically establish a condition of balance for any position of the element 51 wherein both valves of the control valve are in closed position and a reaction is exerted on the control element which is proportional to the pressure supplied to the actuator. The self-lapping operation of the valve mechanism in controlling the operation of the ailerons on rotation of the control element in a plane transverse to the axis of the airplane is of an identical nature, and is therefore not described in detail. In the event of failure of the supply of fluid pressure in the reservoir 26, it will be apparent that no reaction can be exerted on the control element by the valve plunger and that subsequently the disc 50 will be free to move in any direction until it contacts abutments 117, 118, 119 or 120 formed on the valve casing, which serve to limit movement of the disc. The mechanical controls will thus be ineffective until the movement of the control element is sufficient to cause the disc to engage one or more of these abutments, although the airplane may still be controlled by the mechanical connections alone, although there will be some lost motion due to movement of the disc.

In order to overcome the above difficulty in the event of failure of the fluid pressure supply in the reservoir, there has been provided, as illustrated more particularly in Fig. 2, means for automatically eliminating the above action, such means including an annular cylinder 121 formed in the lower portion of the valve casing concentric therewith and provided with an annular piston 122 slidably mounted therein and normally urged in an upward direction by means of a spring 123 interposed between the lower face of the piston and a cover plate 124 bolted to the bottom of the valve housing, this plate being provided with a vent 125 in order to subject the lower side of the piston to atmospheric pressure at all times. The portion of the cylinder above the piston is provided with an inlet port 126, the latter being connected to the reservoir by means of a conduit 127 which is connected with the conduit 38 which serves to supply fluid pressure to the inlet chambers of the control valves. Thus whenever the pressure of fluid in the reservoir is sufficient to overcome the tension of the spring 123, the piston is maintained in the position shown, the piston being prevented from further downward movement by means of a stop 128 which abuts the upper surface of the cover plate 124. The upper portion of the annular piston is provided with a number of spaced rods such as 129 which are suitably guided for sliding movement in bores such as 130 formed in the housing, one of these rods being positioned adjacent each of the control valves. These rods are preferably of the same diameter as the clearance between the periphery of the disc 50 and the abutments 117, 118, 119 and 120, and serve on upward movement under the action of the spring 123 to engage the face of the abutments and the periphery of the disc in order to effectively prevent movement of the latter in any direction. In order to facilitate the upward movement of these rods in the event the disc is displaced from its normal central position, the upper ends of the rods are provided with a tapered portion such as 131 which serves to cam the disc back toward its central position. Leakage by the piston is prevented by means of a suitable sealing element 132, and it will be seen that whenever the degree of fluid pressure in the reservoir is sufficient to maintain the piston in downward position, the disc 51 will be free to move in order to control the operation of the various control valves, while in the event the pressure is insufficient to maintain the piston in the position shown, the latter will be moved upward by the spring in order to lock the disc in its central position, in order to permit mechanical operation of the control surfaces of the airplane without lost motion which would otherwise interfere with proper control by the pilot.

It is sometimes considered desirable to provide power operation of the control surfaces of the airplane already equipped for mechanical operation, and this may be accomplished in the embodiment of the invention shown in Fig. 4 of the drawing by substituting for the original pilot's control element, a new control element which is provided with suitable control valves for controlling the operation of the actuators which serve to operate the control surfaces. The system is again illustrated in connection with an elevator 4 adapted for movement about an axis 5, together with ailerons 6 and 7, adapted for movement respectively about axes 8 and 9. A double-acting fluid motor 10, of similar construction to that shown in Fig. 1, is connected to the elevator by means of a piston rod 11 and a lever 12, while the ailerons are operated in this embodiment by single-acting fluid motors 133 and 134 provided with pistons and piston rods 135 and 136 connected respectively with the upper ends of the levers 17 and 20 carried by the ailerons 6 and 7.

Mechanical operation of the elevator and ailerons is accomplished by means of a control member 137 pivotally mounted for transverse movement by means of a pivot pin 138 on a crank member 139 having its crank arms 140 and 141 pivotally mounted in suitable brackets 142 and 143 for rotation on an axis located transversely of the airplane, it thus being apparent that the member 137 may be rotated transversely of the airplane without effecting the operation of the crank member, while rotation of the member in a plane at right angles thereto will serve to rotate the crank member about its transverse axis, thus providing for universal movement of the member 137. The member 137 is provided with a quadrant portion 144 and a cable 145 suitably connected thereto is connected at one end with the lower end of the lever 20, and at the other end with the lower end of the lever 17 on the aileron 6, the cable being guided on the left side by the pulleys 146, 147 and 148, and on the right side by the pulleys 149, 150, and 151. In order to prevent distortion of the cable during rotation of the member 137 in a fore and aft direction, the upper ends of the crank arms 140 and 141 are provided with bores 152 and 153 concentric with the axis of rotation thereof, and the cables are so arranged as to pass through these bores along the center line thereof, the only distortion being a slight twist imparted to the cable. In order to keep the cable under tension and to insure positive operation of the ailerons in both directions, the lower ends of the levers 17 and 20 are interconnected by means of a cable 154, connected at one end to the lever 17 and at the other end to the lever 20, the cable being suitably guided by means of pulleys 155 and 156, and so installed as to insure that the cables are under a predetermined tension at all times. Mechanical operation of the elevator 4 through the operation of the member 137 is accomplished by means of a lever 157 mounted for rotation with the crank arm 141, the upper end of the lever being connected with the lower end of the lever 12 by means of a cable 158 guided by suitable pulleys 159, 160, 161 and 162, and the lower end of the lever being connected with the lower end of the lever 12 to move the latter in the opposite direction by means of a cable 163 suitably guided by means of pulleys 164, 165 and 166.

Thus, on movement of the member 137 in a counter-clockwise direction about the pivot 138 as viewed in the drawing, a force will be imparted to the cable 145 which will be transmitted to the lower end of the lever 20 to rotate the aileron 7 in a clockwise direction, this force likewise being imparted to the cable 154 which will move the lower end of the lever 17 to the right in order to rotate the aileron 6 in a counter-clockwise direction, thus serving to depress the right wing of the airplane and raise the left wing of the airplane in order to tip the airplane to the right, movement of the member 137 in the reverse direction serving to provide a reverse operation of the ailerons. In the event a force is imparted to the member 137 at a point above the center line of the bores 152 and 153 in a fore and aft direction, the crank member 139 will be rotated in one direction or the other, counter-clockwise rotation serving to impart a force to the cable 158 which tends to move the lower end of the lever 12 to impart clockwise rotation to the elevator 4, movement of the member 137 in the opposite direction serving to tension the cable 163 to rotate the elevator in the other direction.

In order to provide suitable means by which the pilot may have a direct mechanical control of the member 137 as well as control of the force supplied to the fluid actuators, the member 137 is provided with a flanged portion 167, to which is bolted a vertically positioned control valve housing 168 having a pair of control valve mechanisms 169 and 170 normally positioned in a vertical plane extending longitudinally of the airplane, the valve casing in addition being provided with a pair of oppositely disposed and vertically positioned valves, not fully shown, positioned in a plane at right angles to the above plane, the valve indicated at the left of the drawing in the transverse plane being designated as 171 and the oppositely disposed valve in the same plane being designated as 172.

Since the valves are identical in their construction, the valve 169 illustrated in section will be described in detail, it being noted that the casing 168 is provided with an inlet chamber 173, common to all the valves, this chamber being connected to a suitable reservoir 174 by means of a conduit 175. The reservoir 174 is supplied with fluid pressure from a compressor, not shown, through the medium of a conduit 176. The valve mechanism 169 is provided with an outlet chamber 177 and an exhaust chamber 178 in the same manner as the control valve 31 illustrated in Fig. 2, communication between the inlet and outlet chambers being controlled by means of an inlet valve 179 and communication between the outlet chamber and exhaust chamber being controlled by means of an exhaust valve 180 connected thereto. A piston 181 is slidably mounted in the outlet chamber and serves to control communication between the outlet and exhaust chambers, the piston being provided with an upwardly extending stem 182 which serves to actuate the piston. The valve mechanism is provided with an outlet port 183 connected to the outlet chamber and an exhaust port 184 connected to the exhaust chamber, it being understood that with the parts in the position shown, wherein the inlet valve is in closed position and the exhaust valve is in open position, the valves serve to prevent communication between the inlet chamber and the outlet port and to permit communication between the outlet port and the exhaust port through a piston bore 184a and a port 184b formed in the wall thereof, while on downward movement of the valve operating plunger 182, the valve serves to prevent communication between the outlet and exhaust ports and to establish communication between the inlet chamber and the outlet port. In like manner, the valve 171 is provided with outlet and exhaust ports 185 and 186 respectively, the valve 170 being provided with outlet and exhaust ports 187 and 188 and the valve 172 being provided with outlet and exhaust ports 189 and 190.

The upper portion of the valve casing 168 is provided with a plate 191 having a ball socket 192 centrally located therein and adapted to receive a ball 193 formed on the lower end of a pilot's control element 194 in order to provide for universal movement of the element with respect to the plate and to the valve casing. The four valve operating plungers of the valves 169, 170, 171 and 172 are arranged to extend upwardly, the upper ends of these plungers being normally in contact with the lower surface of a valve operating plate 195 mounted on the lower end of the element 194 directly above the ball 193 and held against movement with respect thereto by means of a suitable connecting pin 196. As shown in the drawing, the lower surface of the plate 195 is spaced from the upper surface of the plate 191 by a short distance, this distance being limited to that necessary for permitting sufficient movement of the upper plate with respect to the lower plate to insure proper operation of the valve operating plungers. Thus on rotation of the element 194 in the plane of the valves 169 and 170, rotation in a counter-clockwise direction will serve to depress the plunger 182 in order to prevent communication between the exhaust port 184 and the outlet port 183 and to permit communication between the inlet chamber 173 and the outlet port. The outlet port 183 is connected to the left end of the motor 10 through a flexible conduit 197, and fluid pressure is thus supplied to the left end of the motor to move the piston to the right in order to rotate the elevator 4 in a clockwise direction to raise the tail of the airplane. In like manner, movement of the element 194 in the reverse direction serves to actuate the valve mechanism 170 to supply fluid pressure to the outlet port 187, the latter being connected to the right end of the motor 10 by means of a flexible conduit 198, thus causing the piston to be moved to the left to impart counterclockwise rotation to the elevator 4. On movement of the element 194 with respect to the valve casing 168 in a plane at right angles to the above plane, the valves 171 and 172 may be selectively operated, movement of the element in a counter-clockwise direction to operate the valve 171 serving to supply fluid pressure to the outlet port 185 to supply fluid pressure to the left end of the motor 134 through a conduit 199, thus moving the piston rod 136 to the right to impart clockwise rotation to the aileron 7 in order to lift the left wing of the airplane and tip the airplane to the right. In view of the cable connection between the lower end of the lever 20 and the lower end of the lever 17, it will be understood that counterclockwise rotation of the aileron 6 occurs at the same time clockwise rotation of the aileron 7 takes place. In like manner on movement of the element 194 in the reverse direction, the valve 172 will be operated to supply fluid pressure to the outlet port 189 and fluid pressure will be conducted to the left end of the motor 133 through a flexible conduit 200 to move the piston rod 135 to the right and impart reverse rotation to the ailerons.

In the event rapid operation of the various controls is desired, it will be apparent that in view of the small separation of the plates 191 and 195, mechanical operation of the surfaces will be also obtained as soon as the periphery of the plate 195 contacts the upper surface of the plate 191. In addition to the foregoing, the operator is also advised by a sense of feel on the control element as to the degree of fluid pressure supplied to the various motors in view of the fact that the piston 181 of the valve 169, for example, as well as the pistons of the other control valves, is subjected on its lower surface at all times to the pressure supplied to the fluid motor controlled thereby, and with the control element held at any given angle from neutral position, it will be understood that subsequent action of the corresponding fluid motor will tend to move the controls until such time as the control member 137 and the valve casing 168 attached thereto is moved sufficiently with respect to the plate 195 carried by the control element to permit the valves to move to lapped position in order to maintain the desired and necessary pressure in the fluid motor being controlled. With the valves in lapped position, the only force imparted from the control element to the member 137 will be that imparted due to the reaction of pressure in the fluid motors and acting on the valve pistons.

It will be understood from the foregoing that in the event of failure of the fluid pressure supply in the reservoir 174, a lost motion effect will exist between the control element and the control member 137, and in order to overcome the undesirable effects of this action on the control of the airplane by the pilot, means are provided somewhat similar to those provided in connection with the embodiment shown in Fig. 1, whereby the lost motion can be automatically eliminated on failure of the fluid pressure supply. As shown, such means includes a projection 201 extending downwardly from the ball 193 on the element 194 together with a socket member 202 mounted for sliding movement in the valve casing and adapted on upward movement to engage the projection 201 and prevent relative movement between the control element and the valve casing. This socket member is connected by means of a downwardly extending stem 203 with a piston 204 slidably mounted in a cylinder 205 connected at its upper end with the inlet chamber 173 as shown and normally urged in an upward direction by means of a suitable spring 206. Thus, whenever the degree of pressure in the reservoir 174, and correspondingly in the inlet chamber 173 and in the cylinder 205 is sufficient to overcome the tension of the spring 206, the socket member 202 will be positioned as shown in order to permit relative movement between the control element and the valve casing, while on depletion of the pressure below this value, the spring will move the piston and socket upward to engage the extension 201 in order to lock the element 194 and the valve casing 168 together. Under this type of operation, the mechanical connections between the member 137 and the control surfaces will be fully effective to operate the latter without any lost motion between the member and element which would otherwise interfere with proper control of the airplane by the pilot.

Thus during normal power operation mechanical force is imparted to the control surfaces by the pilot up to the extent of the reaction on the valve operating piston or plunger, while in the event the degree of power available to operate the control surface to the desired angle is insufficient, the operator is able, during operation of either embodiment of the invention to take up the lost motion between the control element and the valve operating members in order to add any desired mechanical force to the force already being applied by the fluid motors. In addition to the above, conventional mechanical operation without lost motion in the controls is assured at all times in the event of the failure of power supplied without necessitating any special action on the part of the pilot in order to insure such operation.

While two embodiments of the invention have been illustrated and described with considerable particularity, it is to be understood that various modifications may be resorted to without departing from the spirit of the invention, as will be readily understood by those skilled in the art. Reference will, therefore, be had to the appended claims for a definition of the limits of the invention.

What is claimed is:

1. The combination in an airplane having a body portion and an airfoil movably mounted with respect thereto for controlling the direction of movement thereof, of means for controlling the operation of the airfoil including a fluid actuator having an operating connection therewith, means including a control valve for controlling the supply of fluid pressure to said actuator, a control member mounted for limited movement relative to said body portion for operating said valve, and a normally vertical, manually operable control element having an operating connection adjacent its lower end with said airfoil and being universally supported on said valve operating member intermediate its ends.

2. The combination in an airplane having a body portion and an airfoil movably mounted with respect thereto for controlling the direction of movement thereof, of means for controlling the operation of said airfoil including a source of fluid pressure, a fluid actuator having an operating connection with said airfoil, means including a control valve for controlling the supply of fluid pressure from the source to the actuator, a control member mounted for limited movement with respect to said body portion for controlling the operation of said valve, a control element having a pivotal connection at one point thereon with the member for operating the latter and a connection at another point thereon with the airfoil, and means including a pressure responsive member associated with said member and subjected to the pressure of fluid from said source for preventing movement of said control member relative to said body portion by the operation of said control element when the pressure at said source is less than a predetermined value.

3. The combination in an airplane having a body portion, an airfoil movably mounted thereon for controlling the attitude of the airplane with respect to its transverse axis and a second airfoil movably mounted with respect thereto for controlling the attitude of the airplane with respect to its longitudinal axis, of means for selectively controlling the operation of said airfoils for separate or concurrent operation including fluid actuator means for moving the first named airfoil, fluid actuator means for moving the second named airfoil, a control element for operating said airfoils having connections therewith for operating the latter, means for mounting said element for universal movement including a fulcrum member pivotally connected thereto and mounted for limited movement with respect to said body portion, and means for controlling the supply of fluid pressure to said actuator means including control valve mechanism operable by movement of said fulcrum member relative to said body portion.

4. The combination in an airplane having a body portion and an airfoil movably mounted with respect thereto for controlling the operation thereof, of means for controlling the operation of said airfoil including a fluid actuator connected therewith, a source of fluid pressure, a casing control valve means in said casing for controlling the supply of fluid pressure to said actuator, a member responsive to the pressure in said actuator and movable in one direction for controlling the operation of said valve means, a control element for moving said member in the opposite direction to operate said valve means, means for mechanically operating said airfoil by said element when said member is moved a predetermined amount in said opposite direction, and means responsive to the pressure at said source for preventing said predetermined amount of movement of said member by said element when said pressure is less than a predetermined value to directly and mechanically operate the airfoil in response to movement of the element, comprising a latch movable between said element and casing.

5. Control mechanism for a plurality of devices adapted for selective actuation including a control element, a movable fulcrum member pivotally connected with said element, a fluid actuator for each device, means including a control valve for supplying fluid pressure to each actuator, a valve controlling member for each valve subjected to the pressure in the corresponding actuator and having an operating connection with said movable fulcrum member, and mechanical connections between said element and devices for mechanically operating any one of said devices on operation of said control element in a direction to supply fluid pressure to the actuator therefor by operation of the corresponding control valve.

6. Control mechanism for a plurality of devices sdapted for selective actuation including a control element, a movable fulcrum member pivotally connected with said element, a fluid actuator for each device, a source of fluid pressure, means including a control valve for supplying fluid pressure from said source to each actuator, a valve controlling member for each valve subjected to the pressure supplied to the corresponding actuator and having a connection with said movable fulcrum member, means for mechanically connecting said element and devices for mechanically operating any one of said devices on operation of said control element to supply fluid pressure to the actuator therefor by operation of the corresponding control valve, and means controlled by the pressure of fluid at said source for preventing movement of said fulcrum member when said pressure is less than a predetermined value.

7. Control mechanism for a plurality of devices adapted for selective operation including a fluid actuator for each device, a control lever, a movable fulcrum member having a universal pivotal connection with said lever at one portion thereof, means for limiting the movement of said member to a single plane, means for limiting the degree of movement of said member in said plane to a predetermined value in any direction, a pair of control valves for each actuator each having inlet and exhaust valves and a valve operating member responsive to the pressure in the actuator and adapted to engage said fulcrum member for selective operation thereby, and mechanical connections between said devices and another portion of the lever.

8. Control mechanism for a plurality of devices adapted for selective operation including a fluid actuator for each device, a control lever having a direct mechanical connection with each of the devices, a movable fulcrum member having a universal pivotal connection with said lever spaced along said lever from said mechanical connections, means for limiting movement of said fuling the degree of movement of the fulcrum member in said plane, and a pair of control valves for each actuator each having inlet and exhaust valves and a valve operating member responsive to the pressure in the actuator controlled by the corresponding valve, each of said pressure responsive members engaging said fulcrum member and being adapted for selective operation by movement of the fulcrum member in said one plane.

9. Control valve mechanism for a pair of double acting fluid actuators provided with pistons including a casing, a pair of oppositely disposed control valves in the casing for controlling one of the actuators, a second pair of oppositely disposed control valves in the casing for controlling the other actuator arranged in substantially the plane of the first named pair of control valves and having their longitudinal axis substantially at right angles to the axis of the first named valves, a pressure responsive valve operating member slidably mounted along the axis of each control valve, a fulcrum member mounted for limited sliding movement in the casing substantially in the plane of the control valves and in engagement with the pressure responsive members, and a lever for operating said valve mechanism having one portion universally pivotally connected with the fulcrum member and another portion mechanically connected with each of the pistons.

10. Control mechanism for a pair of devices adapted to be actuated and having a fluid actuator for operating each device, said mechanism including a separate control valve for each actuator having a movable valve operating member responsive to the pressure in the corresponding actuator, a fulcrum member for operating said pressure responsive members mounted for limited sliding movement in one plane and operable on movement in one direction in said plane to move one of said pressure responsive members and on movement in said plane in a direction substantially at right angles to said one direction to operate the other pressure responsive member, and means for operating said fulcrum member and for mechanically operating said devices including an operator's control element having one portion universally pivotally connected with said fulcrum member and another portion mechanically connected with said devices.

11. The combination as set forth in claim 1 which comprises in addition, a source of fluid pressure, and means including a pressure responsive member responsive to the pressure of fluid from the source and movable, when said pressure is less than a predetermined value, to a position between the control member and said body portion to prevent said limited relative movement.

12. The combination as set forth in claim 3 which comprises in addition, a source of fluid pressure, and means responsive to the pressure of the fluid from said source and operable on failure of said pressure to prevent said relative movement between the fulcrum member and the body portion.

WILFRED A. EATON.

REFERENCES CITED

The following references are of record in the file of this patent:

UNITED STATES PATENTS

| Number | Name | Date |
|---|---|---|
| 1,339,332 | Greenly | May 4, 1920 |
| 1,928,915 | Stout | Oct. 13, 1933 |
| 2,075,917 | Vorech | Apr. 6, 1937 |
| 2,140,037 | Swisher | Dec. 13, 1938 |
| 2,229,530 | South | Jan. 21, 1941 |
| 2,274,734 | Pelterie | Mar. 3, 1942 |
| 2,337,706 | Berry | Dec. 28, 1943 |

FOREIGN PATENTS

| Number | Country | Date |
|---|---|---|
| 130,213 | Great Britain | July 31, 1919 |